Jan. 20, 1931.  F. J. OVEN  1,789,594
SPARK PLUG GASKET
Filed Jan. 21, 1929
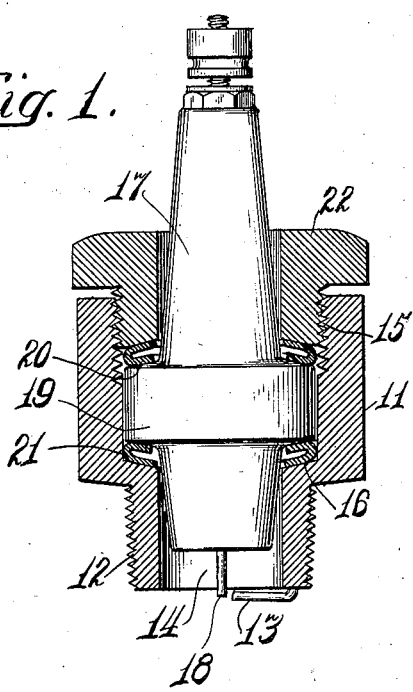
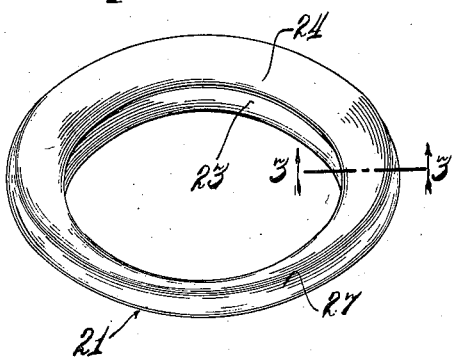
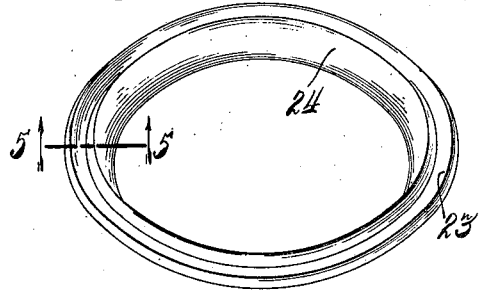
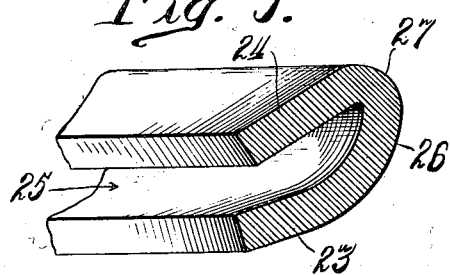
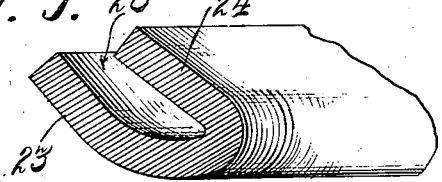
Inventor
Frank J. Oven
Attorney Patented Jan. 20, 1931

1,789,594

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

SPARK-PLUG GASKET

Application filed January 21, 1929. Serial No. 334,012.

This invention relates to improvements in gaskets and more particularly spark plug gaskets.

One object of the invention is to provide a novel gasket for use between the seating surfaces of the porcelain core and the metal shell and between the seating surfaces of the porcelain core and the follower nut of a spark plug, which will provide a gas tight connection and which will not injure the porcelain.

Another object of the invention is to provide a novel spark plug gasket that will readily flex and adapt itself to the seating surfaces of the porcelain core so as to compensate for any irregularities therein.

Another object of the invention is to provide a gasket that will increase in diameter when subjected to pressure thereby forming a leak proof seal.

Many spark plug gaskets of known construction commonly are made with a filler such as asbestos, which is entirely eliminated in this improved gasket. Others are made solid, rigid and non-resilient, all incapable of circumferential expansion, and consequently, tend to injure the porcelain of the spark plug under pressure. These objectionable features are overcome in the present invention, illustrated in the accompanying drawing, in which:

Fig. 1 is a view of a spark plug comprising a gasket embodying the features of the invention, the view showing the shell and follower nut and gaskets in axial section and the porcelain in elevation.

Fig. 2 is a perspective view of the preferred form of a gasket.

Fig. 3 is a transverse section taken on line 3—3 of Fig. 2.

Fig. 4 is a perspective view of a modified form of the gasket.

Fig. 5 is a transverse section taken on line 5—5 of Fig. 4.

The spark plug illustrated in Fig. 1 comprises a shell 11, the lower end of which is threaded externally as indicated at 12 and carries an electrode 13. The shell is formed with a central axial bore 14, the upper end of which is enlarged and threaded internally as indicated as at 15. The two portions of the bore 14 are connected by a downwardly tapering annular shoulder 16. A porcelain insulating body 17 carrying an electrode 18 on its inner end is disposed in the bore 14, and is formed with a peripheral enlargement 19 intermediate its ends and above the shoulder 16. The opposite faces of the enlargement 19 are slightly tapered and constitute seats for upper and lower gaskets 20 and 21. The lower gasket 21 rests against the shoulder 16 and the upper gasket 20 is engaged by the inner end of a follower nut 22 threaded into the upper end of the sleeve 11 to secure the insulation in position. The inner end of the nut 22 is tapered upwardly.

In the preferred form of the invention illustrated in Figs. 1 to 3, each gasket 20 and 21 comprises an annular piece of metal bent back on itself to form opposed spaced layers 23 and 24 defining an inwardly opening channel 25. The layer 23 is substantially straight adjacent its free margin, and from this straight portion is inclined in a gradual curve, as indicated at 26, to the junction with the layer 24. Preferably the junction is substantially arcuate as indicated at 27. The layer 24 is substantially straight and is inclined relative to the portion 26 of the layer 23.

In the present instance, the layers 23 and 24 are inclined in the same general direction from the plane of the gasket so as to define substantially conical surfaces adapted to conform to the confining abutments of the spark plug.

In use (see Fig. 1) the layers 23 are seated respectively against the shoulder 16 and inner end of the follower nut 22 to which they substantially conform, and the layers 24 are seated respectively against the opposed ends of the enlargement 19. As the follower nut 22 is screwed down it exerts a vertical pressure adjacent the outer circumference of the gaskets 20 and 21, thereby causing the arcuate portions to move outwardly due to resultant forces, and hence increasing the diameter of the gaskets and effecting a tight peripheral fit so as to enhance the gas leak preventing qualities. At the same time, the upper layers 23 tend to rotate towards a horizontal plane so as to engage and compensate for the irregularity in the seating surfaces of the porcelain.

The modified form of gasket illustrated in Fig. 4 is in all respects similar to the preferred form except that it has an outwardly opening channel 28 instead of the inwardly opening channel 25.

The principal advantages of the invention reside in the means for compensating for the irregularities in the seating surfaces of the porcelain to prevent injuries thereto, the elimination of a refractory filler and the provision of double layers arranged for circumferential expansion under applied pressure.

I claim:

1. A gasket formed of an annular section of metal bent back upon itself to form opposed spaced layers providing an open channel, one of said layers being substantially parallel with the central radial plane of said gasket, the other of said layers being inclined toward said plane, said parallel section having the end thereof remote from said opening gradually curved toward said other layer and joined thereto to provide an arcuated portion to provide for radial movement by a straightening out action due to compression of the layers toward each other.

2. A gasket formed of an annular section of metal bent back upon itself to form opposed spaced layers providing an inwardly opening channel, one of said layers being substantially parallel with the central radial plane of said gasket, the other of said layers being inclined inwardly toward said plane, said parallel section having the end thereof remote from said opening gradually curved toward said other layer, said other layer having a rounded portion of relatively small radius at the end thereof remote from said opening, said last named rounded portion merging with said first named rounded portion to provide an arcuated portion on said gasket opposite said channel opening, said arcuated portion having radial movement by a straightening out action due to compressing of said layers toward each other.

In testimony whereof I affix my signature at 10 South La Salle Street, Chicago, Illinois.

FRANK J. OVEN.